United States Patent [19]

Franzmeier

[11] Patent Number: 5,212,633
[45] Date of Patent: May 18, 1993

[54] SYSTEM FOR TRANSFERRING RESIDENT PROGRAMS TO VIRTUAL AREA AND RECALLING FOR INSTANT EXCUTION IN MEMORY LIMITED DOS SYSTEM USING PROGRAM CONTROL TABLES

[75] Inventor: James W. Franzmeier, Tempe, Ariz.

[73] Assignee: ShareData, Phoenix, Ariz.

[21] Appl. No.: 395,527

[22] Filed: Aug. 18, 1989

[51] Int. Cl.[5] ............................. G06F 12/02; G06F 9/44
[52] U.S. Cl. ................................ 395/500; 364/246.11;
364/243.2; 364/243.3; 364/281.1; 364/964.3;
364/966.4; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 3,618,045 | 11/1971 | Campbell | 364/200 |
| 4,215,407 | 7/1980 | Gomola et al. | 364/468 |
| 4,768,150 | 8/1988 | Chang et al. | 364/200 |
| 4,780,821 | 10/1988 | Crossley | 364/200 |
| 4,897,780 | 1/1990 | Lakness | 364/200 |
| 4,912,628 | 3/1990 | Briggs | 364/200 |
| 4,967,353 | 10/1990 | Brenner et al. | 364/200 |

OTHER PUBLICATIONS

Edward Mendelson, Swap Shuffles RAM-hungry TSRs to Hard Disk, EMS PC Magazine vol. 8, No. 8, p. 54, Apr. 25.
Edward Mendelson, Headroom One-Ups Software Carousel with memory management innovations PC Magazine vol. 8, No. 4, p. 38 Feb. 28, 1989.

Primary Examiner—Thomas C. Lee
Assistant Examiner—Ken S. Kim
Attorney, Agent, or Firm—Knobbe, Martens, Olson & Bear

[57] ABSTRACT

A DOS computer system which effectively extends the DOS main memory capacity without the addition of supplemental random access memory (RAM) to the DOS main memory. The system enables application programs to be transferred from secondary hard disk memory to RAM on an as needed basis and enable active application programs in RAM to be placed in suspension in virtual memory for instantaneous recall to RAM to become active application programs and be executed from the point at which the application program was suspended for transfer to virtual memory.

3 Claims, 7 Drawing Sheets

FIG. 2A

| 22 | DOS | CS | 44 |
| | | DS | 23 |
| 24 | AMI | CS | 26 |
| | | DS | 25 |
| 27 | DESK | CS | 29 |
| | | DS | 28 |
| 36 | | | |

| 0 | A | AMI |
| 1 | A | DESK |
| 2 | U | |
| 3 | U | |
| 4 | U | |
| 5 | U | |
| ... | | |
| n-3 | U | |
| n-2 | U | |
| n-1 | U | |
| n | U | |

FIG. 2C

| 1 | U | | | |
| 2 | U | | | |
| 3 | U | | | |
| 4 | U | | | |
| 5 | U | | | |
| 6 | U | | | |
| ... | | | | |
| 61 | U | | | |
| 62 | U | | | |
| 63 | U | | | |
| 64 | U | | | |

| 18 | AMI |
| 19 | DESK |
| 30 | WP |
| 31 | FS |
| 32 | MES |
| 33 | GR |
| 34 | SS |
| 35 | NOTES |
| 37 | |
| 38 | 47 — BROTH |
| 39 | |

FIG. 2E

| 0 | |
| 1 | |
| 2 | |
| 3 | |
| ... | |
| n-2 | |
| n-1 | |
| n | |

FIG. 2F

| A1 | |
| A2 | |
| ... | |
| An | |

FIG. 3A

| | | | |
|---|---|---|---|
| 22 | DOS | CS | 44 |
| | | DS | 23 |
| 24 | AMI | CS | 26 |
| | | DS | 25 |
| 27 | DESK | CS | 29 |
| | | DS | 28 |
| 40 | [2] WP | CS | 42 |
| | | DS | 43 |
| 41 | [3] FS | CS | 45 |
| | | DS | 46 |
| 36 | | | |

| 0 | A | AMI | |
| 1 | A | DESK | |
| 2 | I | WP | [1] |
| 3 | A | FS | [2] |
| 4 | U | | |
| 5 | U | | |
| ... | | | |
| n-3 | U | | |
| n-2 | U | | |
| n-1 | U | | |
| n | U | | |

FIG. 3C

| 1 | U | | | |
| 2 | U | | | |
| 3 | U | | | |
| 4 | U | | | |
| 5 | U | | | |
| 6 | U | | | |
| ... | | | | |
| 61 | U | | | |
| 62 | U | | | |
| 63 | U | | | |
| 64 | U | | | |

FIG. 3D

| | | |
|---|---|---|
| 18 | AMI | |
| 19 | DESK | |
| 30 | WP | |
| 31 | FS | |
| 32 | MES | |
| 33 | GR | |
| 34 | SS | |
| 35 | NOTES | |
| 37 | | |
| 38 | BROTH | 47 |
| 39 | | |

| 0 | |
| 1 | |
| 2 | |
| 3 | A1 |
| ... | |
| n-2 | |
| n-1 | |
| n | |

FIG. 3F

| A1 | DISPLAY INDEX OF FILES |
| A2 | |
| ... | |
| An | |

FIG. 4A

| | | | |
|---|---|---|---|
| 22 | DOS | CS | 44 |
| | | DS | 23 |
| 24 | AMI | CS | 26 |
| | | DS | 25 |
| 27 | DESK | CS | 29 |
| | | DS | 28 |
| 40 | [2] WP | CS | 42 |
| | | DS | 43 |
| 41 | [3] FS | CS | 45 |
| | | DS | 46 |
| 36 | | | |

| 0 | A | AMI |
| 1 | A | DESK |
| 2 | A | WP [1] |
| 3 | I | FS [2] |
| 4 | | |
| 5 | | |
| n-3 | U | |
| n-2 | U | |
| n-1 | U | |
| n | U | |

FIG. 4C

| 1 | U | |
| 2 | U | |
| 3 | U | |
| 4 | U | |
| 5 | U | |
| 6 | U | |
| 61 | U | |
| 62 | U | |
| 63 | U | |
| 64 | U | |

FIG. 4D

| | | |
|---|---|---|
| 18 | AMI | 21 |
| 19 | DESK | |
| 30 | WP | |
| 31 | FS | |
| 32 | MES | |
| 33 | GR | |
| 34 | SS | |
| 35 | NOTES | |
| 37 | | |
| 38 | BROTH | 47 |
| 39 | | |

FIG. 4E

| 0 | |
| 1 | |
| 2 | A1 |
| 3 | |
| n-2 | |
| n-1 | |
| n | |

FIG. 4F

| A1 | FILE NAME IS BROTHER |
| A2 | |
| An | |

| | | | |
|---|---|---|---|
| 22 — DOS | CS | 44 | |
| | DS | 23 | |
| 24 — AMI | CS | 26 | |
| | DS | 25 | |
| 27 — DESK | CS | 29 | |
| | DS | 28 | |
| 48 — [4] MES | CS | 58 | |
| | DS | 59 | |
| 49 — [5] FS | CS | 50 | |
| | DS | 51 | |
| 36 — | | | |
| 20 ↗ | | | |

FIG. 6B

| 0 | A | AMI | |
| 1 | A | DESK | |
| 2 | S | WP | [1] |
| 3 | S | FS | [2] |
| 4 | A | MES | [1] |
| 5 | I | FS | [4] |
| ... | | | |
| n-3 | U | | |
| n-2 | U | | |
| n-1 | U | | |
| n | U | | |

FIG. 6C

| 1 | S | 2 | | BROTH |
| 2 | S | 2 | | BROTH |
| 3 | S | 2 | | BROTH |
| 4 | A | 4 | 6 | SHARE |
| 5 | U | | | |
| 6 | U | | | |
| ... | | | | |
| 61 | U | | | |
| 62 | U | | | |
| 63 | U | | | |
| 64 | U | | | |

FIG. 6D

| 21 ↘ | |
|---|---|
| 18 — | AMI |
| 19 — | DESK |
| 30 — | WP |
| 31 — | FS |
| 32 — | MES |
| 33 — | GR |
| 34 — | SS |
| 35 — | NOTES |
| | [2] WP — 40 / 37 |
| | [3] FS — 41 |
| 38 — | BROTH — 47 |
| | BROTH — 52 |
| 39 — | |

FIG. 6E

| 0 | |
| 1 | |
| 2 | |
| 3 | |
| ... | |
| n-2 | |
| n-1 | |
| n | |

FIG. 6F

| A1 | |
| A2 | |
| ... | |
| An | |

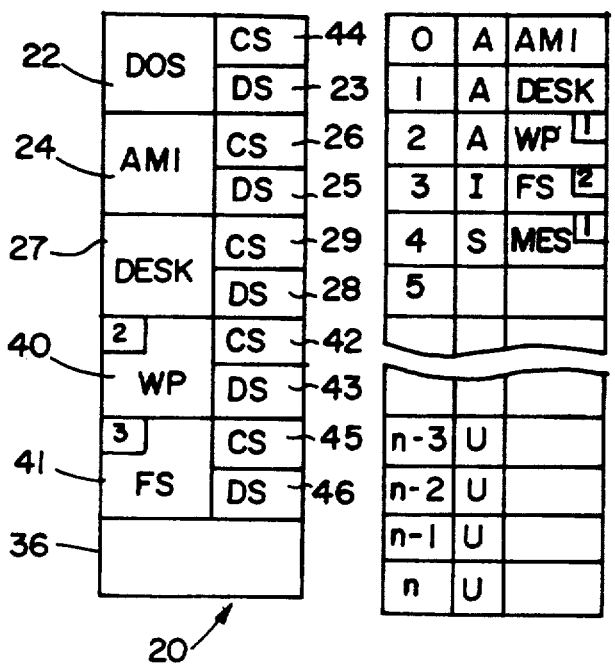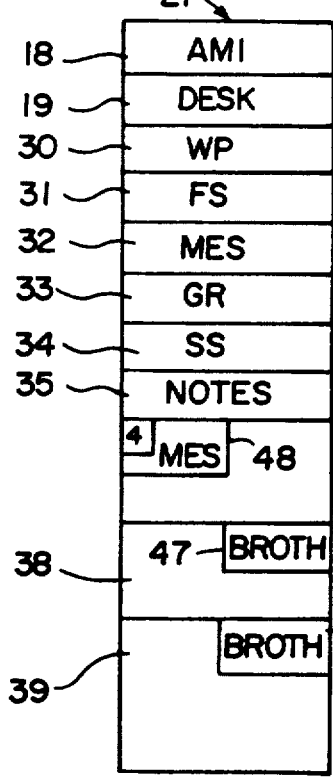

SYSTEM FOR TRANSFERRING RESIDENT PROGRAMS TO VIRTUAL AREA AND RECALLING FOR INSTANT EXCUTION IN MEMORY LIMITED DOS SYSTEM USING PROGRAM CONTROL TABLES

BACKGROUND OF THE INVENTION

This invention relates to a computer system and, more particularly, relates to a computer system run under a disk operation system (DOS).

In a further respect, the invention relates to a DOS computer system which effectively extends the DOS main memory capacity without the addition of supplemental random access memory (RAM) to the DOS main memory.

In another respect, the invention relates to a DOS computer system which increases, without the addition of supplemental RAM, the number of available files handles in the system.

In still another respect, the invention relates to a computer system which is run under DOS and which enables application programs to be transferred from secondary hard disk memory to RAM on an as needed basis and enables active application programs in RAM to be placed in suspension in virtual memory for instantaneous recall to RAM to become an active application program and be executed from the point at which the application program was suspended for transfer to virtual memory.

In yet a further respect the invention relates to a computer system which is run under a disk operating system and which enables application programs to transfer control and send messages to other application programs.

A personal computer or microcomputer typically uses a disk operating system (DOS). DOS is a set of commands or programs that the computer uses to provide a uniform interface between the computer hardware and application programs in the computer. DOS permits the application programs to communicate with the computer hardware. DOS is a relatively primitive software which does not allow application programs to, while execution of the programs is in process, be temporarily suspended for instant recall. One reason DOS does not permit the suspension of in process application programs is the limited storage space provided in RAM for active application programs. If a user wishes to interrupt the execution of an application program in RAM and to begin execution of another application program, the user often must return the active program to secondary disk memory and transfer the other new application program from secondary memory to RAM to be executed. When execution of the new application program is completed and the user wishes to complete execution of the original application program, the DOS resident program directory must be searched to locate and return the original application to RAM to become an active progam to complete execution of the original program.

Accordingly, it would be highly desirable to provide an improved computer system which is run under a disk operating system and which permits an active application program to be temporarily suspended and removed from RAM to secondary hard disk memory in a manner which permits instant recall of the suspended application program to RAM.

Therefore, it is a principal object of the invention to provide an improved computer system which is run under a disk operating system (DOS).

A further object of the invention is to provide an improved microcomputer system which is run under DOS and which enables an active application program to be temporarily suspended from RAM for subsequent instant recall to RAM to complete execution of the application program, the temporary suspension of the application program permitting RAM to be utilized for execution of another active application program.

Another object of the invention is to provide an improved computer system which runs under DOS and which enables application programs to send messages and directly transfer control to other application programs.

Still a further object of the invention is to provide an improved computer system which runs under DOS and which increases the number of file handles which can be utilized in conjunction with DOS to track files utilized during operation of the computer system.

Yet another object of the instant invention is to provide an improved computer system which is run under DOS and which effectively extends the RAM capacity by utilizing a plurality of discrete application programs which each performs one primary function and deals with generally one kind of data.

These and other further and more specific objects and advantages of the invention will be apparent to those skilled in the art from the following detailed description thereof, taken in conjunction with the drawings.

BRIEF DESCRIPTION OF THE DRAWINGS

FIG. 2A is a block diagram illustrating the main memory in the computer system of FIG. 1 after the AM1 and DESK programs have been loaded into the main memory;

FIGS. 2B, 2C, 2E, and 2F are block diagrams illustrating the application control table, file handle control table, primary message table, and auxiliary message table, respectively, in the DS area of the AM1 program after the AM1 and DESK programs have been loaded in main memory;

FIG. 2D is a block diagram illustrating secondary memory after the AM1 and DESK programs have initially been loaded in the main memory of FIG. 2A;

FIG. 3A, is a block diagram illustrating the main memory in the computer system of FIG. 1 after the WP program has been loaded and after the FS program has been loaded at the request of the WP program and is active, the WP program becoming inactive during execution of the FS program;

FIGS. 3B, 3C, 3E, and 3F are block diagrams illustrating the application control table, file handle control table, address area of the message table, and storage area of the message table, respectively, after WP program has been loaded and after the FS program has been loaded at the request of the WP program and is active and is ready to request messages stored in the message table for the FS program;

FIG. 3D is a block diagram illustrating secondary disk memory after the WP program has been loaded into main memory and after the FS program has been loaded at the request of the WP program and is active, the WP program becoming inactive in main memory during execution of the FS program;

FIG. 4A is a block diagram illustrating the main memory in the computer system of FIG. 1 after the FS program loaded in FIG. 3 has found and identified in the resource data area of secondary memory a document named BROTHER and has left a message for the WP program in the massage table identifying the name (and, if necessary, address information for the BROTHER document) of the document, after the FS program has returned control to the WP program and become inactive in main memory, and when the WP program is about to receive from the message table the name of the document;

FIGS. 4B, 4C, 4E, 4F are block diagrams illustrating the application control table, file handle control table, primary address area of the message table, and storage area of the message table, respectively, after the FS program loaded in FIG. 3 has found and identified in resource data area of secondary memory a document named BROTHER and has left a message for the WP program in the message table identifying the name (and, if necessary, address information for the BROTHER document) of the document, after the FS program has returned control to the WP program and become inactive in main memory, and when the WP program is about to receive from the message table the name of the document;

FIG. 4D is a block diagram illustrating secondary disk memory after the FS program loaded in FIG. 3 has found and identified in the resource data area of secondary memory a document named BROTHER and has left a message for the WP program in the message table identifying the name (and, if necessary, additional information concerning the address of the document in the resource data of secondary memory) of the document, after the FS program has returned control to the WP program and become inactive in main memory, and when the WP program is about to receive from the message table the name of the document identified by the FS program;

FIG. 5A is a block diagram illustrating the main memory in the computer system of FIG. 1 after the active WP program of FIG. 4 has received the message identifying the document selected by the FS program as the BROTHER document, after the WP program has requested the AM1 program open a file for the BROTHER document, and after the AM1 program has opened a file and noted in the file handle table the DOS file handle and AM1 file handle;

FIGS. 5B, 5C, 5E and 5F are block diagrams illustrating the application control table, file handle control table, primary address area of message table, and storage area of the message table, respectively, after the active WP program of FIG. 4 has received the message identifying the document selected by the FS program as the BROTHER document, after the WP program has requested the AM1 program open a file for the BROTHER document, and after the AM1 program has opened a file and noted in the file handle table the DOS file handle and AM1 file handle;

FIG. 5D is a block diagram illustrating the secondary disk memory after the WP program of FIG. 4 has received the message identifying the document selected by the FS program as the BROTHER document, after the WP program has requested the AM1 program open a file for the BROTHER document, and after the AM1 program has opened a file and noted in the file handle table the DOS file handle and AM1 file handle;

FIG. 6A is a block diagram illustrating the main memory of the computer system of FIG. 1 after the AM1 program has transferred the WP and FS programs in the main memory in FIG. 5 to suspension in virtual memory of the secondary disk memory, after the AM1 program 24 has loaded the MES program into main memory, after the FS program resident in the resource data area of the secondary memory has been loaded by the AM1 program into main memory at the request of the MES program, after the FS program loaded in main memory at the request of the MES program has selected a file names SHAREDATA and transferred control back to the MES program, after the MES program—on receiving control back from the FS program and obtaining the name of the SHAREDATA file from the message table—has requested the AM1 program open a file for SHAREDATA, and after the AM1 program has opened the SHAREDATA file and noted in the file handle table the DOS file handle and AM1 file handle for the SHAREDATA file;

FIGS. 6B, 6C, 6E, and 6F are block diagrams illustrating the application control table, file handle control table, primary address area of the message table, and storage area of the message table, respectively, after the AM1 program has transferred the WP and FS programs in the main memory in FIG. 5 to suspension in the virtual memory area of the secondary disk memory, after the AM1 program has transferred the WP and FS programs in the main memory in FIG. 5 to suspension in the virtual memory area of the secondary disk memory, after the AM1 program has loaded the MES program into main memory at the request of the user, after the FS program resident in the resource data area of the secondary memory has been loaded by AM1 into main memory at the request of the MES program (or the user), after the FS program loaded in main memory at the request of the MES program has selected a file named SHAREDATA and transferred control back to the MES program, after the MES program—on receiving control back from the FS program and obtaining the name of the SHAREDATA file from the message table—has requested the AM1 program open a file for SHAREDATA, and after the AM1 program has opened the SHAREDATA file and noted in the file handle table the DOS file handle and AM1 file handle for the SHAREDATA file;

FIG. 6D is a block diagram illustrating the secondary disk memory after the AM1 program has transferred the WP and FS program in the main memory in FIG. 5 to suspension in the virtual memory area of the secondary disk memory, after the AM1 program has loaded the MES program into main memory at the request of the user, after the FS program resident in the resource data area of the secondary memory has been loaded by AM1 into main memory at the request of the MES program (or the user), after the FS program loaded in main memory at the request of the MES program has selected a file named SHAREDATA and transferred control back to the MES program, after the MES program—on receiving control back from the FS program and obtaining the name of the SHAREDATA file from the message table—has requested the AM1 program open a file for SHAREDATA, and after the AM1 program has opened the SHAREDATA file and noted in the file handle table the DOS file handle and AM1 file handle for the SHAREDATA file;

FIGS. 7A, 7B, 7C, 7D, 7E, and 7F are block diagrams illustrating the main memory of the computer system of FIG. 1 after the MES program or the user has cancelled the FS program in main memory in FIG. 6A, after the user has taken a message in the SHAREDATA file and has returned to the DESK program to request that the WP program in suspension in FIG. 6D be returned to main memory and activated, and after the WP and FS programs in virtual memory in FIG. 6D have been returned to main memory and the WP program is active and the BROTHER file is being utilized; and, FIG. 8 is a block diagram illustrating secondary memory and the use of an index pointer which can be moved to correspond to and identify addresses in secondary memory.

SUMMARY OF THE INVENTION

Figure 1:
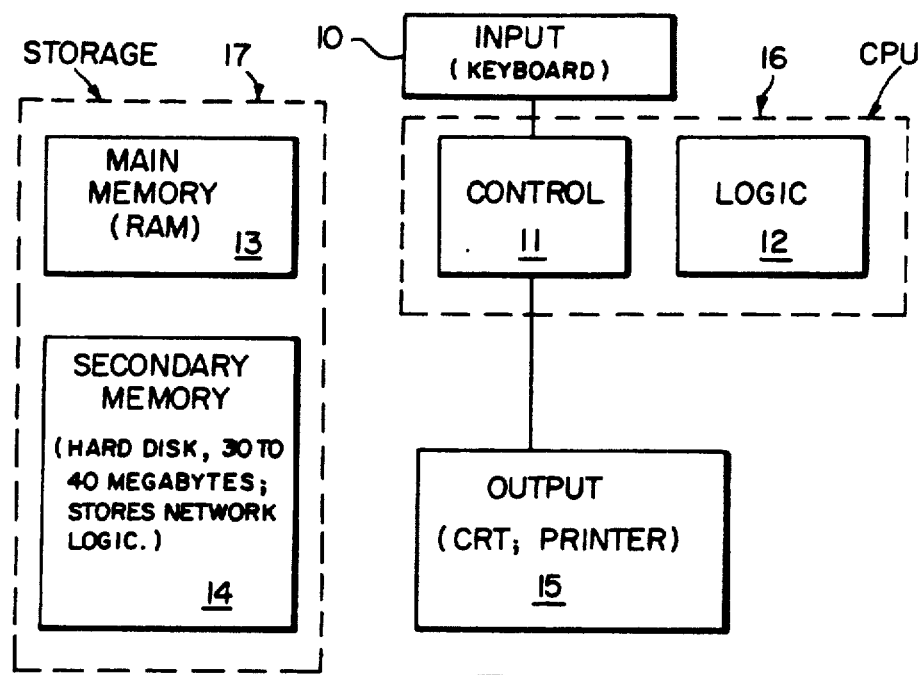
FIG. 1 is a block diagram illustrating the hardware comprising a microcomputer constructed in accordance with the principles of the invention.

Briefly, in accordance with my invention, I provide an improved computer system run under a disk operating system (DOS). The computer system includes main memory means including a limited storage area for storing at least one application program to become an active application program and be executed; secondary memory means including an area for storing resource data including resident files, an area for storing inactive resident application programs for transfer to the limited storage area of the first memory means for execution—each of the resident programs sized to be stored within an area having the size of the limited storage area and each including a data storage (DS) area and a computer logic storage (CS) area, a virtual memory area for storing in suspension an active application program transferred from the limited storage area prior to completion of execution of the program in the limited storage area, storing program data in excess of the storage capacity of the DS area of the active application program; controller means responsive to the active program for means for surveying the virtual memory area and assigning an application program storage space in the virtual memory area for storing the corresponding application program to be transferred from active status in the limited storage area in suspension into the virtual memory area; transmission means responsive to the operation of the application program transfer means for creating a LS program location address entry indicating the location of the corresponding application program in the limited storage area when the corresponding resident program is transferred from the secondary memory means into the limited storage area and for transmitting the LS program location address entry, and application program suspension means for creating a VM program location address entry indicating the location of the corresponding application program in the virtual memory area when the corresponding program is transferred from active status in the limited storage area in suspension into the virtual memory area and for transmitting the VM program location address entry; application program control table means responsive to operation of the application program transfer means for creating an application program control table corresponding to the resident application program to be transferred from the secondary storage means to the limited storage area to become active and be executed, each program control table containing information used in transferring the corresponding application to and from suspension in the virtual memory area and in controlling execution of the corresponding application program, generating a corresponding program control table identification entry, each program control block identification entry linking the application program to the corresponding program control table, and for receiving and storing in the control table the transmitted LS and VM program location entries transmitted by the transmission means for the corresponding application program, DS entries transmitted by the program suspension means for the corresponding active application program when the corresponding application program is suspended, work area address entries transmitted by the program suspension means for identifying the location in the work area of program data from the corresponding active program stored in the work area when the corresponding program is suspended, and operating on the resource data; keyboard means for entering user commands for controlling execution of application programs and for controlling the transfer of application programs between the main memory means and the secondary memory means; application transfer means responsive to a resident application program request resulting from user commands or the execution of a presently active application program in the limited storage area to transfer a corresponding resident application program from secondary memory to the limited storage area of the primary memory means to become an active program and be executed; application program suspension means responsive to operation of an application program suspension request resulting from user commands or the execution of a presently active application program in the limited storage area to transfer the corresponding application program, and all data in the DS area thereof, from active status in the limited storage area to the virtual memory area in suspension prior to completion of execution in the main memory means of the corresponding application program, determine the DS address entry identifying the location in scanning data in the DS area of the corresponding active application program when the program is suspended for transfer to the virtual memory area and to transmit the DS address entry, determine the CS address entry identifying the location in executing logic steps in the CS area of the corresponding active program when the program is suspended for transfer to the virtual memory area and to transmit the CS address entry, and, determine the work area address entry identifying the location in the work area of the secondary memory means of program data from the corresponding active application program which is stored in the work area when the corresponding active program is suspended, and to transmit the work area address entry; memory manager means responsive to operation of the application program transfer means for surveying the limited storage area and assigning an application program storage space in the limited storage area for storing the corresponding resident application program to be transferred into the main memory means, and, application program suspension CS entries transmitted by the program suspension means for the corresponding active application program when the corresponding active application program is suspended, the most recent of the entries for each of the program location entries, the DS entries, the work address entries, and the CS entries being identified in the control table for the corresponding application program; application program recall means responsive to operation of an application program recall request resulting from user commands or the execution of a presently active application program including the data in the DS area of the corresponding application program to transfer a corresponding suspended application program including the data in the DS area of the corresponding suspended application program from the virtual memory area to the limited storage area to be an active application program to be executed; and, means responsive to operation of the application program recall means for examining in the control table for the corresponding recalled application program the most recent of any LS and VM program location address entries to locate the corresponding recalled application program in the virtual memory area, DS address to determine the address in the DS area of the corresponding recalled application program when the corresponding recalled application program was suspended, and CS address to determine the address in the CS area of the corresponding recalled application program when the corresponding recalled application program was suspended.

The improved computer program of my invention noted above can include means for an active application program in the limited storage area to send a message to another application program. The message sending means includes message transfer means responsive to a message transmittal request resulting from user commands or the execution of a presently active application program to transmit a message from a corresponding active application program in the limited storage area, the message including data identifying the application program receiving the message; application program message control means responsive to operation of the message transfer means for creating an application program message table corresponding to the application program receiving the message transmitted by the message transfer means from the corresponding active application program, each message table containing information used in transmitting the message to the receiving application program, generating for the message table a corresponding program message table identification entry, each program message table identification entry linking the receiving application program to the corresponding message table, and receiving the message transmitted by the message transfer means and storing the message in the message table corresponding to the application program receiving the message; and message transmittal means responsive to a message transmittal request resulting from user commands in the active receiving application program or to the execution of the active receiving application program to transmit the message from the corresponding message table to the active receiving application program.

The improved computer program of my invention noted above can further include means for selecting a resident file for use in an active application program and for monitoring the location of the file in the main memory means and the secondary memory means. The file selection means includes file selection means responsive to a select file request resulting from user commands during a presently active application program or from the execution of a presently active application program to select a corresponding resident file from the secondary memory means for use in execution of the active application program; file handle table means responsive to operation of the file selection means for creating a file handle control table corresponding to the selected file, each file handle control table containing information used when transferring the active application program to and from suspension in the virtual memory area and in transferring the selected file between the secondary memory means and the main memory means, generating for the file handle control table a corresponding file control table DOS handle, each DOS handle linking the selected file to the corresponding file control table, when the active application program is transferred to the virtual memory area or when the selected file is transferred from the active application program storage in secondary memory, releasing the DOS handle from the control table to subsequently be assigned to another file or resident application program being transferred from the secondary memory means to the main memory means, generating for the file handle control table a corresponding file control table auxiliary handle, the auxiliary handle linking the selected file to the corresponding file control table when the active application program in which the selected file is used is transferred to the virtual memory area or when the corresponding file is transferred from the active application program to storage in the secondary memory means, and creating for the file handle control table a file application program entry linking the selected file to the corresponding application program most recently utilizing the selected file.

DESCRIPTION OF THE PREFERRED EMBODIMENTS

Turning now to the drawings, which depict the presently preferred embodiments and best mode of the invention for the purpose of illustrating the practice thereof and not by way of limitation of the scope of the invention and in which like reference characters represent corresponding elements throughout the several views, FIGS. 1 to 8 illustrate a computer system constructed in accordance with the principles of the invention. The preferred embodiment of the invention is designed for use with IBM PC DOS, versions 2.0 and later, and uses only IBM PC supported basic input output system (BIOS) and PC DOS functions. This allows the program to work on future releases of PC DOS without having to be modified.

Information on specific implementation of DOS can be found in the IBM PC manual entitled Disk Operating System by Microsoft Corp., version 2.1 (1983), as well as in operating manuals for subsequent versions of DOS. The IBM PC manual entitled IBM PC manual entitled Disk Operating System, Technical Reference, by Microsoft Corp. version 2.1 (1983) also provides useful information.

The hardware utilized in the system of the invention is illustrated in FIG. 1 and consists of the hardware found in a conventional personal computer or microcomputer. The hardware includes a keyboard input or other input 10, a CPU 16, a storage area 17, and an output 15. The CPU 16 includes control 11 and logic 12. The storage 17 includes main memory or RAM (random access memory) 13 and secondary memory 14. Secondary memory 14 is typically stored on a thirty to forty megabyte hard disk. Output 15 ordinarily comprises a CRT or printer. See Computer Law Software Protection by David Bender 1987, Vols. I and II, Mathew Bender and Company, Inc. §2.02.

The following hypothetical sequence of events illustrates the use of software, named INTO for purposes of reference, in conjunction with the computer system of FIG. 1 run under a disk operating system.

EVENT 1

The user utilizes keyboard 10 to type in c>[prompt] INTO, which appears on the screen of the CRT. The user hits the return key on the keyboard 10. This causes the resident AM1 and DESK programs in secondary memory 21 to be loaded in Main Memory 20. FIGS. 2A to 2F illustrate the status of various areas in the main memory 20 and secondary memory 21 after the AM1 and DESK programs have been loaded in main memory 20.

The main memory 20 is shown in FIG. 2A and, for purposes of the discussion herein, includes 640K of storage space. The DOS NETWORK software 22 includes a data storage (DS) area 23 and a computer logic storage (CS) area 44 and requires 196K of storage space. The software 22 includes DOS software (65K of storage space) and the network operating system software (131K of storage space). The AM1 program 24 includes a data storage (DS) area 25 and a computer logic storage (CS) area 26. The DESK program 27 includes a DS area 28 and a CS area 29. The DESK and AM1 programs require 164K of storage space. After the AM1 24 and DESK 27 programs are loaded in main memory 20, 280K of storage space remains. Further, after the AM1 and DESK programs are loaded, a primary display screen from DESK automatically appears on the CRT output 15. Resident application programs stored in secondary memory 21 are listed in a Resident Program Table area on the left hand side of the DESK primary display screen. As shown in FIG. 2D, the resident programs stored in secondary memory includes WP (word processing) 30, FS (file system) 31, MES (message system) 32, GR (graphics) 33, SS (spread sheet) 34 and NOTES (note storage system) 35. Other desired resident application programs can be stored in secondary memory 21. The user can direct that any one of the resident application programs in secondary memory 21 be loaded into the remaining 280K storage area 36 of main memory by positioning the cursor on the CRT screen adjacent the desired resident application program and pushing a "select" button on the keyboard 10. The select button typically comprises the return key on the keyboard.

The AM1 program 24 is supervisory software which oversees the transfer of application programs between main memory 20 and secondary memory 21, the transmission of messages from one application program to another application program, interfaces with the DOS program 22, and performs other functions which will be self evident from the following description. The DESK program 27 interfaces between the application programs and AM1.

FIGS. 2B to 7B illustrate the application program control table maintained in the DS 25 area of the AM1 program The left hand column in FIG. 2B, as well as in FIGS. 3B to 7B, comprises program control numbers 0, 1, 2, ... n−1, n each assigned to a resident program transferred from secondary memory to main memory. The program number assigned to an application program with the program as long as it is in the limited storage area 36 of the main memory 20 or in the virtual memory area 37 of secondary memory 21. Status entries in the middle column in the program control table of FIGS. 2B to 7B indicate whether a program control number is unused (U), or, after a program number is assigned to a program, whether the program is active (A) in main memory, inactive (I) in main memory 20, or is suspended (S) in the virtual memory area 37 of secondary memory 21. Letter entries in the right hand column of the program control table of FIGS. 2B to 7B indicate the name, if any, of the program assigned to a particular program number. In FIG. 2B the AM1 and DESK programs have been assigned program numbers 0 and 1, respectively. As indicated by the letters "A" in the middle column of the table of FIG. 2B, the AM1 and DESK programs are each active in main memory. As will be described, other information can be stored in the program control table.

FIGS. 2C to 7C each indicate a file handle control table maintained in the DS 25 area of the AM1 program. Numerical entries in the left hand column of the file handle control table of FIGS. 2C to 7C represents auxiliary file handle numbers 1 to 64 each assigned by AM1 to a file opened by an active application program in main memory 20. The second column from the left in the control table of FIGS. 2C to 7C includes letter status entries which indicate whether an auxiliary file handle number is unused (U), or, when an auxiliary file handle number is assigned to a file, whether the file is active (A) in an application program in main memory 20 or is suspended (S) in a program in suspension in the virtual memory area 37 of secondary memory 21. In FIG. 2C, none of the auxiliary file handle numbers 1 to 64 has been assigned to a file. Consequently, the letter U (unused) appears in the second column from the left for each of the auxiliary file handle numbers 1 to 64. The middle column of each of the control tables of FIGS. 2C to 7C includes numerical entries which indicate the program control number which links the file to its associated parent application program. If, for example, the resident WP program 30 is loaded into the limited storage area 36, is assigned program number 2 in the program control table of FIG. 2B and is used to open a file BROTH which is assigned the auxiliary file handle number 1 in the file handle control table of FIG. 2C, then the number 2 would appear in the middle square of the first line of the table of FIG. 2C. The fourth column from the left of the file handle control table of FIG. 2C to 7C includes numerical entries which indicate the DOS file handle number assigned to a file listed in the file handle control table. When a file is opened and listed in the file handle control table of FIGS. 2C to 7C, the AM1 program obtains a DOS file handle number from the DOS program 22. The DOS program 22 ordinarily only has the file handle numbers 1 to 20 available. Of these twenty file numbers, the first five, 1 to 5, are utilized by the DOS program 22 itself. The remaining DOS file handle numbers 6 to 20 are assigned when available. Accordingly, a file listed in the file handle control table of FIGS. 2C to 7C could be assigned a DOS file handle number in the range of 6 to 20. The right hand column in the file handle control table of FIG. 2C includes entries which comprise an address to a complete DOS path. The DOS path includes up to 128 characters which describe the file name, file directives, etc. For purposes of clarity in FIG. 2C the address to a complete DOS path is indicated by the first five letters in the name of the file. The DOS path can include other information concerning the address of the file in secondary memory 21.

FIGS. 2D to 7D illustrate the secondary hard disk memory 21. The AM1 18 and DESK 19 programs are stored in the resident program storage area of secondary memory, along with resident application programs WP 30, FS 31, MES 32, GR 33, SS 34 and NOTES 35.

Secondary memory 21 also includes virtual memory area 37 for storing, in suspension, an active application program transferred from the limited storage area 36 prior to completion of execution of the active program, includes an area 38 for storing resource data including resident files, and includes a work area 39 for, during execution of an active application program in the limited storage area, storing program data in excess of the storage capacity of the DS area of the active application program.

FIGS. 2E to 7E illustrate the primary address area of the message table maintained in the DS 25 area of the AM1 program. The left hand column of the primary address area of FIGS. 2E to 7E comprises the program control numbers, corresponding to the numbers in the left hand column of the program control table of FIGS. 2B to 7B, assigned to application programs receiving a message. Entries in the right hand column of the address area of FIGS. 2E to 7E each indicate the addresses of messages in the message table storage area of FIGS. 2F to 7F. Up to eight addresses can be stored in the right hand column for each program control number.

FIGS. 2F to 7F illustrate the message table storage area maintained in the DS 25 area of the AM1 program. The left hand column of the message table storage area of FIGS. 2E to 7E comprises entries which indicate the address A1, A2, . . . An of a message in the storage area. Entries in the right hand column indicate the actual message stored in the storage area at a particular address A1, A2, . . . An.

EVENT 2

The user uses the CRT screen cursor to select the WP program from the list of resident application programs shown on the left hand side of the DESK primary display screen. AM1 receives the select WP program command and then selects the next available space in the program control table of FIG. 2B. Since the AM1 and DESK programs occupy the spaces for program control numbers 0 and 1, AM1 assigns the program control number 2 space to the WP program and also, in the middle column of the program control table of FIGS. 2B colinear with control number 2 enters A to indicate the WP program is active in main memory. Also entered in the program control table of FIGS. 2B is the description of the WP application program, including the size of the CS and DS areas of the task, and where in the limited storage area 36 the WP application is located. The AM1 program surveys storage area 36 to determine if sufficient storage space is available and where to store the WP program. The name, WP, of the application program is entered by the AM1 program in the right hand column of the program control table colinear with the program control number 2. The program control number of the application program which immediately preceded and requested transfer of the WP program to main memory is also entered in the program control table. Since the DESK program was used to request loading of the WP program, the program control number of 1 is entered. In FIG. 3B, the program control number of the preceding DESK program is represented by the small superscript "1" contained in the small box to the upper right of the program name WP. After the AM1 program 24 has made the foregoing entries in the program control table for the WP application program, the AM1 program 24 transfers the WP program from the resident program storage area of secondary memory 21 to the limited storage area 36 of main memory or RAM 20.

While the AM1 program 24 loads the resident WP program 30 into main memory, the DESK 22 program does nothing. Once the WP program is loaded 40 in main memory, keyboard entries can be made to transfer control back to the DESK program. If the user makes such an election, the WP program becomes inactive in main memory, the AM1 program transfers control back to the DESK program, and the DESK primary display screen appears on the CRT. On the right hand side of the DESK primary display screen is a suspension table area which includes a list of suspended and inactive application programs. Accordingly, the inactive WP application program is listed in this right hand area of the screen. In our hypothetical example, however, the user does not elect to return to DESK but takes another course of action noted below in EVENT 3.

When the WP program is loaded into the main memory, a primary WP display screen appears on the CRT. The flashing cursor light on the primary WP display screen indicates that the WP program is asking the AM1 program to provide any input from the keyboard 10. The AM1 24 program asks DOS to give keystroke information to AM1. Consequently, when an operator hits keys on the keyboard 10, the information goes to the DOS program 22, from the DOS program 22 to the AM1 program 24, and from the AM1 program 24 to the WP program in the limited storage area 36.

Once the WP program is loaded in main memory, the user decides to modify an existing document called BROTHER. The operator consequently needs to utilize the FS (file system) application program to retrieve the BROTHER document. This leads to EVENT 3.

EVENT 3

The user strikes keyboard keys which ask the AM1 program to load the resident FS program 31 in main memory. These keystrokes could comprise "LOAD FS", "SELECT DOCUMENT", or other keystrokes which que the AM1 program to load the FS application program.

The AM1 program receives the select FS program command and then selects the next available space in the program control table of FIG. 2B. Since the AM1, DESK and WP programs occupy the spaces for program control numbers 0, 1, and 2, respectively, the AM1 program assigns the program control number 3 space to the FS program and also, in the middle column of the program control table colinear with control number 3, enters A to indicate that the state or status of the FS program is active in main memory. In the middle column of the program table colinear with control number 2, the AM1 program enters I to indicate that the WP program is inactive in main memory. Also entered in the program control table of FIGS. 2B to 7B are the description of the FS application program, including the size of the CS and DS areas of the program, and where in the limited storage area 36 the FS application program is located. The AM1 program surveys storage area 36 to determine if sufficient storage space is available and where to store the FS program. Since each of the resident application programs 30 to 35 requires 120K storage space, the AM1 program determines there is sufficient space in the limited storage area 36 for the FS program. The name, FS, of the application program is entered by the AM1 program in the right hand column of the program control table colinear with the program control number 3. The program control number of the application program which immediately preceded and requested transfer of the FS program to main memory is also entered in the program control table. Since the WP program was used to request loading of the FS program, the program control number of 2 is entered. In FIG. 3B, the program control number of the preceding WP program is represented by the small superscript "2" contained in the small box to the upper right of the program name FS. After the AM1 program has made the foregoing entries in the program control table for the FS and WP application programs, the AM1 program transfers the FS program 31 from the resident program storage area of secondary memory 21 to the limited storage area 36 of main memory or RAM 20.

While the AM1 program 24 loads the resident FS program 31 into main memory, the DESK program 27 does nothing. Once the FS program is loaded in RAM, keyboard entries can be made to transfer control back to the DESK program. If the user makes such an election, the FS program becomes inactive in main memory along with the WP program, the AM1 program transfers control back to the DESK program, and the DESK primary display screen appears on the CRT. On the right hand side of the DESK primary display screen is a suspension table area which lists suspended or inactive application programs. The only suspended or inactive programs listed, however, in the suspension table are those invoked or called up by the DESK program 27. For example, the WP program 40 is called up by the DESK program and would, when suspended, be listed in the suspension table. The FS program 41 would never be listed in the Suspension Table because program 41 was not requested by the DESK program. Program 41 was instead requested by program 40. The inactive FS and WP programs are listed in this right hand area of the DESK primary display screen. In our hypothetical example, however, the user does not elect to return to DESK but takes another course of action noted below in EVENT 4.

When the user, while in the active WP program, 40 asks the AM1 program to load the FS program, the WP program 40 sends a message to the FS program. The message is "DISPLAY INDEX OF FILES". When the FS program 41 receives this message, it causes the FS program to display a primary screen with the index of documents. This message from the WP program is received by the AM1 program and transferred to the message table illustrated in FIGS. 2E to 7E and 2F to 7F. In particular, FIGS. 3E and 3F illustrate the status of the message table after the AM1 program has made the appropriate entries therein. In the primary address area of the message table shown in FIG. 3E, the entry A1 indicates there is a message for the application program having program control number 3, i.e., there is a message for the FS program 41. The message is in the message table storage area (FIG. 3F) at the address A1. In FIG. 3F, the message at address A1 is shown as reading "DISPLAY INDEX OF FILES". This is the message which the WP 40 program sent to the FS program 41.

CURRENT STATUS ILLUSTRATION

FIGS. 3A to 3F illustrate the status of the main memory 20, application program control table (FIG. 3B), file handle control table (FIG. 3C), secondary memory 21, primary address area of the message table (FIG. 3E), and message table storage area (FIG. 3F), after the FS application program has just been loaded into limited storage area 36 and activated and just prior to the time that the active FS application program asks AM1 for any messages to program control number 3, i.e., for any messages to the FS application program 41. Consequently, in FIGS. 3A the WP program 40 and FS program 41 are shown loaded in the limited storage area 36 of RAM 20. The WP program 40 includes a CS area 42 and DS area 43. The FS program 41 includes a CS area 45 and DS area 46. As indicated by the program control table of FIG. 3B, the WP program has been assigned a program control number of 2, has a status of I (inactive main memory), and derives from or was requested under the application program number 1, the DESK program. In FIG. 3B, the FS application program has been assigned a program control number of 3, has a status of A (active in main memory) and derives from or was requested under the application program number 2, the WP program. Since there are presently no active or suspended files, all of the auxiliary file handle numbers are unassigned, as indicated by status letters U in the second column from the left of the file handle table in FIG. 3C. The secondary memory is indicated in FIG. 3D and still includes the resident programs 18, 19, 30 to 35. The virtual memory area 37 and work area 39 are empty. The resource data area 38 includes the BROTH (BROTHER) file and other files not shown, and also includes unused storage area. The primary address area shown in FIG. 3E for the message table notes there is a message at address A1 for program control number 3. Program control number 3 is, according to the program control table of FIG. 3B, the presently active FS program 41 in main memory 20. The message table storage area of FIG. 3F indicates that the message stored at address A1 is "DISPLAY INDEX OF FILES".

After the FS program 41 is loaded into the main memory, a primary FS file index screen appears on the CRT. The primary FS file index screen appears on the CRT because the active FS program 41 queried the AM1 program for its messages, received from the AM1 program 24 the message "DISPLAY INDEX OF FILES", and, according to this command from the WP program, displayed the primary FS file index screen on the CRT. The file index screen illustrates drawers and cabinets or other means for indexing document files in the resource data area 38 of the secondary memory. The user makes keyboard entries to locate the file containing the BROTHER document. For instance, the user can select the files which contain documents having a name beginning with B. Selecting the B files can cause a directory of files beginning with the letter B to be displayed on the screen of the CRT. The user utilizes the CRT screen cursor to select the BROTHER file from the directory and then strikes the RETURN key on the keyboard to return to the WP program. If the user were opening a new file name instead of retrieving an existing file name, the user could, in well known fashion, type in the name of the new file and make key entries necessary to save the new file name to a directory in the FS program.

EVENT 4

The user makes keyboard entries to cause the directory of files beginning with the letter B to appear on the CRT screen. This directory is stored in the DS area 46 of the FS program 41.

EVENT 5

The user uses the CRT screen cursor to select the BROTHER file and depresses the RETURN key on the keyboard 10.

When the user strikes the RETURN key to select the BROTHER file, this indicates to the AM1 program that the user is exiting the FS program. The AM1 program goes to the program control table of FIG. 3B and finds out which program requested the FS program. In FIG. 3B, the number 2 in the small box to the upper right of FS indicates that program control number 2, the WP program 40, requested the FS program. On finding that the WP program requested the FS program, the AM1 program determines the location of the WP program 40 in main memory, activates the WP program 40 and returns to the points in DS area 43 and CS area 42 at which the WP program was inactivated in main memory. If, for some reason, the WP program had been suspended in the virtual memory area 37, The AM1 program have re called and transferred the WP program 40 from area 37 to the limited storage area 36. If, in order to fit the WP program 40 in the storage area 36 it would have been necessary to transfer other programs in area 36 to suspension in area 37, the AM1 program would have transferred the said other programs to area 37 and then would have transferred the WP program 40 from area 37 to area 36. The foregoing "reactivation" of an inactive or suspended WP program 40 is further illustrated below.

When the AM1 program loads the FS program 41 and inactivates the WP program 40, AM1 notes in the program control table of FIG. 3B the location in the CS area 42 and the location in the DS area 43 at the time program 40 is inactivated. This address information enables the AM1 program to resume execution of the WP program 40 at these exact points when the AM1 program deactivates the FS program 41 and reactivates the WP program 40.

When the user, while in the active FS program 41, struck the RETURN key to select the BROTHER file, the FS program sent a message to the WP file. The message is "FILE NAME IS BROTHER".

After the user, while in the active FS program 41, strikes the RETURN key, exits the FS program, and causes the AM1 program 24 to activate the WP program 40, the WP program 40 becomes active and assumes control. As soon as the WP program is activated it, as does each application program 30 to 35 when it is activated, asks AM1 for any messages stored in the message table.

CURRENT STATUS ILLUSTRATION

FIGS. 4A to 4F indicate the status of the main memory 20, application program control table (FIG. 4B), file handle control table (FIG. 4C), secondary memory 21, primary address area of the message table (FIG. 4E), and message table storage area (FIG. 3F), after the WP program 40 has just been reactivated and just prior to the time that the WP program 40 asks AM1 for any messages to program control number 2, i.e., for any messages to the WP application program 40. Consequently, in FIG. 4A the WP program 40 and FS program 41 are shown loaded in the limited storage area 36 of RAM 20. As indicated by the program control table of FIG. 3B, the WP program is assigned a program control number of 2, has a status of A (active in main memory), and derives from or was requested under the program control number 1, the DESK program 27. In FIG. 3B, the FS application program has been assigned a program control number of 3, has a status of I (inactive in main memory) and derives from or was requested under the program control number 2, the WP program 40. Since there are presently no active or suspended files, all of the auxiliary file handle numbers are unassigned, as indicated by the status letters U in the second column of the file handle table of FIG. 4C. The secondary memory 21 of FIG. 4D still includes the resident programs 18, 19, 30 to 35. The virtual memory area 37, and work area 39 are empty. The resource data area 38 includes the BROTH 47 file and other files not shown, and also includes unused storage area. The primary address area shown in FIG. 4E for the message table notes there is a message at address A1 for program control number 2. Program control number 2 is, according to the program table control table of FIG. 4B, the presently active WP program 40 in main memory 20. The message table storage area of FIG. 4F indicates that the message stored at address A1 is "FILE NAME IS BROTHER".

As noted, after the WP program 40 is reactivated, it asks the AM1 program 24 for any messages in the message table of FIGS. 4E and 4F for program control number 2, the WP program 40. The AM1 program sends the WP program 40 the message "FILE NAME IS BROTHER". The WP program 40 automatically asks the AM1 program 24 to open a BROTHER file. The WP program automatically asks the AM1 program 24 to open the file because an opened file is necessary for the WP program 40 to work on the BROTHER file. If desired, the program can require the user to make keyboard entries requesting the AM1 program to open a file. To open the BROTHER file, the AM1 program finds the BROTHER file 47 in the resource data area 38 and links the WP program to that area of the secondary memory. The AM1 program can, in a manner well known to those of skill in the art, transfer data for the WP program to and from the BROTHER file 37 data area in the secondary memory.

Figures 5A, 5B, 5C, 5D, 5E, 5F:
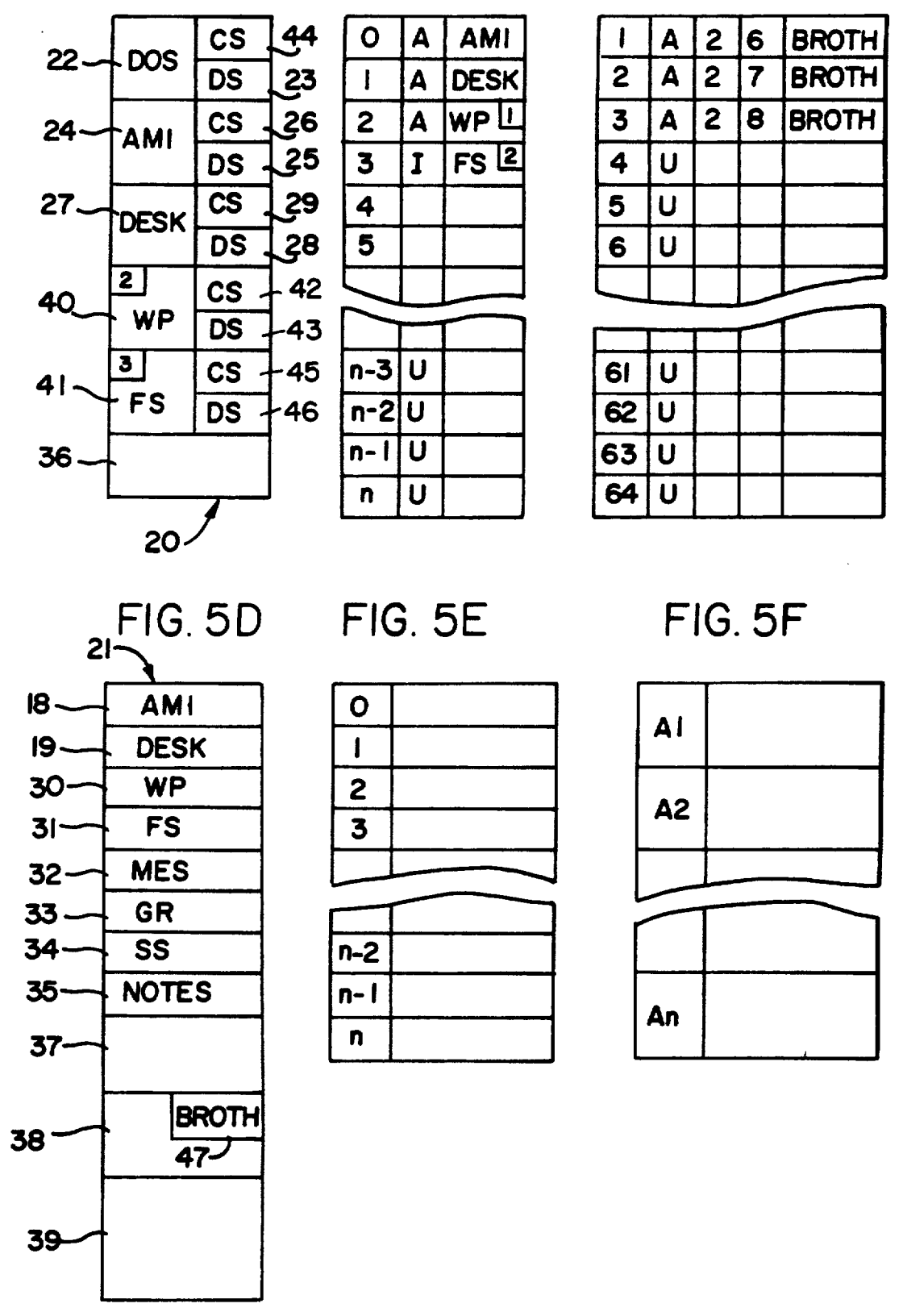

When the WP program 40 asks the AM1 program 24 to open a file for the BROTHER document, AM1 also selects the next available spaces in the file handle control table of FIG. 5C. Since all of the auxiliary file handle numbers in the table of FIG. 5C are unused, the AM1 program assigns the auxiliary file handle numbers 1 to 3 to the BROTHER file, and also, in the second column from the left and colinear with the auxiliary file handle numbers 1 to 3, enters A to indicate that the status of the BROTHER file is that it is active in main memory. In the middle column and colinear with the auxiliary file handle numbers 1 to 3, the AM1 program enters 2 to indicate the program control number of the application program from which the BROTHER file is selected. Program control number 2 in the file handle table of FIG. 5C indicates the "context" of the BROTHER file, and indicates that the BROTHER file has a "live context" which comprises program control number 2. The program control number 2 corresponds, as evidenced by the program control table of FIG. 5B, to the active WP program 40. In the fourth column from the left and colinear with the auxiliary file handle numbers 1 to 3, the AM1 program enters 6 to 8, respectively, to indicate the file handle numbers assigned by the DOS program 22. The AM1 program 24 obtained the DOS file handle numbers of 6 to 8 by asking the DOS program 22 to assign available numbers. The DOS program 22 assigned an available numbers 6 to 20 and gave the AM1 program the numbers. Finally, in the right hand column of the file handle control table of FIG. 5C at locations colinear with each DOS file handle number 6 to 8, the AM1 program enters the first five letters of the file name. Since DOS permits use of the first eight letters of the file name, the AM1 program ordinarily would also use the first eight letters. Only five letters are shown in FIG. 5C for purposes of simplicity. The first DOS file handle 6 (and auxiliary file handle 1) is used in connection with the portion of the BROTHER file in the DS area 43 of the WP program 40. The second DOS handle 7 (and auxiliary handle 2) is used in connection with the portion of the BROTHER file which (a) precedes the portion of the BROTHER file in the DS area 43 and (b) is in the work area 39 of memory 21. The third DOS file handle 8 is used in connection with the portion of the BROTHER file which (a) supercedes the portion of the BROTHER files in the DS area 43 and (b) is in the work area 39 of secondary memory 21.

Figure 8:
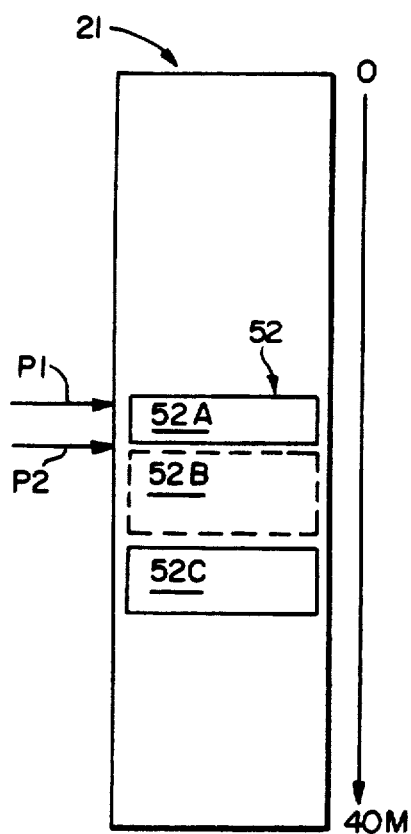

Once the WP program 40 is activated and the BROTHER file has been opened by the AM1 program 24, the user can edit or revise the BROTHER document in conventional fashion, either by typing in new material, or by removing or rearranging old material. In the presently preferred embodiment of the invention, the DS area of the WP program 40 will retain up to 20,000 characters, while the CRT screen displays up to 24 lines of these characters. If during the revision of the BROTHER document, the document becomes longer than the 20,000 character storage space of the DS area 43, portions of the document in excess of the 20,000 character storage of the DS area 43 are stored in the work area 39 of secondary memory 21. Data stored in the work area 39 can be selectively loaded into the DS area 43 for display on the CRT screen or can be displayed on the CRT screen directly from the work area 39. As illustrated in FIG. 8, arrow P1 indicates the location of the address pointer at the beginning of the BROTHER document stored in secondary memory 21. As the BROTHER document is loaded into DS area 43 or is displayed on the CRT screen, the address pointer indexes to a new position or character address indicated by arrow P2. When data from DS area 43 is being displayed on the CRT screen, an address pointer means similar to the pointer used in secondary memory is monitored by the AM1 program at each instant in time to determine the address in the DS area 43 (and CS area 42) being accessed by the WP program 40. For example, in FIG. 8, when the address pointer is at the position indicated by arrow P2, the 20,000 characters of the BROTHER file 52 that were in the storage area 52B of main memory 21 are in the DS area 43 of the WP program 42. DOS file handle address 6 in FIG. 5C is used to monitor that portion 52B of the BROTHER file in DS area 43. The characters of the BROTHER file 52 in storage area 52A are retained in work area 39. DOS file handle address 7 in FIG. 5C is used to monitor that portion of the BROTHER file in storage area 52A of secondary memory 21. The characters of the BROTHER document in storage area 52C are also retained in work area 39. DOS file handle address 8 in FIG. 5C is used to monitor that portion of the BROTHER file in storage area 82A of secondary memory 21. The characters in storage area 52A comprise the first portion of the document comprising the BROTHER file. The characters in the DS area 43 (taken from storage area 52B) comprise the middle portion of the document comprising the BROTHER file. The characters in the storage area 52C comprise the end portion of the document comprising the BROTHER file. Consequently, if the WP program 40 is inactivated in main memory or is suspended to virtual memory 37, the AM1 program is able to store in the program control table of FIG. 4B the location in the DS area (and the CS area) of the WP program 40 when the program is suspended. If the WP program 40 is only deactivated and remains in main memory 20, the DOS program 22 retains the location in the DS area 43 at the instant program 40 is deactivated.

CURRENT STATUS ILLUSTRATION

FIGS. 5A to 5F indicate the status of the main memory 20, application program control table (FIG. 5B), file handle control table (FIG. 5C), secondary memory 21, primary address area of the message table (FIG. 5E), and message table storage area (FIG. 3F), after the AM1 program has opened the BROTHER file at the request of the WP program 40. Consequently, in FIG. 5A the WP program 40 and FS program 41 are shown loaded in the limited storage area 36 of RAM 20. As indicated by the program control table of FIG. 5B, the WP program is assigned a program number of 2, has a status of A (active in main memory), and derives from, has a "live context" of and was requested under the application program control number 1, the DESK program. In FIG. 5B, the FS application program has been assigned a program number of 3, has a status of I (inactive in main memory) and derives from, has a "live context" of, and was requested under the program control number 2, the WP program 40. In FIG. 5C, there is one active file, the BROTHER file. The BROTHER file is, as shown in the file handle control table of FIG. 5C, an auxiliary file handle of 1, associated program control number 2 (the WP program 40), and has a DOS file handle of 5. The secondary memory 21 of FIG. 5D includes the resident programs 18, 19, 30 to 35. The virtual memory area 37 and work area 39 are empty. The resource data area 38 includes the BROTHER file and other files, and includes empty storage space. The primary address area shown in FIG. 5E indicates there are no messages being stored in the message table.

After the WP program is reactivated and the BROTHER file is loaded, the first twenty four lines of the BROTHER document appear on the CRT screen.

EVENT 6

The user begins utilizing keyboard 10 to revise the BROTHER document. The document requires over 20,000 characters of storage space. Consequently, part of the document is stored in the DS area 43 and the remainder of the document is stored in the work area 39. When the AM1 program opened the BROTHER file, it transferred the document from the resource data area 38 to the DS area 43 and the work area 39. While revising the BROTHER document the user receives a telephone call. When the call is received the user is at a DS 43 address of sequential character 542 (of 20,000 characters) and is at a sequential character address in the work area 39 identified by an address pointer like that illustrated in FIG. 8. The user wants to load the resident MES (message) application program 32 to take a telephone message. The user wishes to suspend the WP program 40.

EVENT 7

The user makes an entry on keyboard 10 to suspend the WP program 40.

When the user strikes the suspension key(s) on the keyboard 10, the AM1 program 24 automatically executes the DESK program 24, which in this case is also the predecessor program of the WP program 40. The predecessor program of the WP program is indicated in the program control table by the program control number 1 in the small box to the upper right of the letters WP. The program control number 1 is, as also indicated in the program control table of FIG. 5B, the DESK program 27. Consequently, the AM1 program inactivates the WP program 40 and activates the DESK program 27, causing the DESK primary display screen to appear. In the right hand area of the DESK primary display screen the WP program 40 and FS program 41 are shown in suspension. When the WP program 40 is suspended, the AM1 program removes the A status entry for the WP program from the program control table of FIG. 5B and inserts an I, which indicates that the WP program is inactive in main memory.

As soon as the DESK program 27 is activated it begins asking the AM1 program for input from the keyboard 10.

The user wishes to load the resident MES program 32 into main memory 20 to activate program 32 to take a telephone message.

EVENT 8

The user uses the CRT screen cursor to select the resident MES program 32 from the list of resident application programs shown on the DESK primary display screen. The user depresses the RETURN key on the keyboard to select the MES program.

The AM1 program receives the "SELECT MES PROGRAM" command after the user depresses the RETURN key to select the MES program 32. The AM1 program then selects the next available space in the program control table of FIG. 5B. Since the AM1, DESK, WP, and FS programs occupy the spaces for program control numbers 0 to 3, the AM1 program assigns the program control number 4 to the MES program 32 and also, in the middle column of the program control table of FIG. 5B colinear with control number 4, enters A to indicate the state of the MES program is active in main memory. Also entered in the program control table of FIG. 5B is the description of the MES program, including the size of the CS 58 and DS 59 areas of the program, and where in the limited storage area 36 the MES program is located. In order to determine the address of where in area 36 the MES program will be located, the AM1 program "surveys" area 36. The AM1 program conducts this survey by examining the program control table of FIG. 5B to determine the programs in the limited storage area 36. The WP 40 and FS 41 programs together occupy 240K of storage space, leaving a remaining 40K of storage area. Since the remaining space is insufficient, the AM1 program determines that the WP 40 and FS 41 programs must be transferred in suspension to the virtual memory area 37 in secondary memory, and then determines the location of the MES program in area 36. The name, MES, of the application program is entered by the AM1 program in the right hand column of the program control table of FIG. 5B colinear with the program control number 4. The program control number of the application program which immediately preceded, provides the "live context" for, and requested activation of the MES program is also entered in the program control table. Since the DESK program 27 was used to request activation of the MES program, the program control number of 1 is entered. Finally, the AM1 program also notes in the program control table the address or location in the virtual memory area 37 of the WP program 40 and FS program 41, and in the middle column of FIG. 5B colinear with each of the program control numbers 2 and 3 replaces the A with an S to indicate the WP 40 and FS 41 programs are in suspension in the virtual memory area. After the AM1 program 24 has made the foregoing entries in the program control table for the WP 40, FS 41 and MES 48 programs, the AM1 program transfers the WP 40 and FS 41 programs from area 36 to area 37 and transfers the MES program 32 from the resident program storage area of secondary memory 21 to the limited storage area 36 of main memory or RAM 20.

Once the MES program 48 is loaded in main memory 20, the user elects to open a file in which to store the telephone message the user will soon take.

EVENT 9

The user strikes keyboard keys which ask the AM1 program to load the FS program 31 to main memory. These keystrokes could comprise "LOAD FS", "OPEN FILE", "SELECT DOCUMENT", or other keystrokes which que the AM1 program to load the FS application program.

The AM1 program receives the select FS program 31 command and then selects the next available space in the program control table of FIG. 5B. Since the AM1, DESK, WP, FS, and MES programs occupy the slots for program control numbers 0, 1, 2, 3, 4, respectively, the AM1 program assigns the program control number 5 space to the FS program 49 and also, in the middle column of the program control table and colinear with program control number 5, enters A to indicate that the FS program 49 is active in main memory. In the middle column of the program table and colinear with program control number 4, the AM1 program enters I to indicate that the MES program 48 is inactive in main memory. Also entered in the program table of FIG. 5B are the descriptions of the FS application program 49, including the size of the CS 50 and DS 51 areas of the program, and where in the limited storage area 36 the FS program 49 is located. In order to determine the address of the FS program in area 36, the AM1 program surveys area 36 by examining the program control table. The MES program occupies 120K of the 280K storage area 36, leaving a remaining 160K of storage space. Since the remaining space is sufficient, the AM1 program determines the MES program 48 can remain in main memory in an inactive state. The name, FS, of the application program is entered by AM1 in the right hand column of the program control table of FIG. 5B colinear with the program control number 5. The program control number of the application program which is immediately preceded, provides the "live context" for, and requested activation of the FS program 49 is also entered in the program control table of FIG. 5B. Since the MES program 48 was used to request activation of the FS program, the program control number of 4 is entered. After the AM1 program 24 has made the foregoing entries in the program control table of FIG. 5B for the MES 48 and FS 49 programs, the AM1 program transfers the FS program 32 from the resident program storage area of secondary memory 21 to area 36 to become active and be executed.

When the MES program 48 is suspended to load the FS program 49, the MES program 48 sends to the FS program the message "DISPLAY INDEX OF FILES". The AM1 program 24 stores this message in the message table of FIGS. 5E and 5F. After the FS program 49 is activated in main memory 20, the FS 49 program asks the AM1 program for messages. The AM1 program scans the message table of FIGS. 5E and 5F, finds a message for the FS program 49, and forwards the "DISPLAY INDEX OF FILES" message to the FS program 49. The FS program 49 receives the command "DISPLAY INDEX OF FILES" and presents the primary FS file index screen on the CRT screen. The file index screen illustrates drawers and cabinets or other means for indexing document files stored in the resource data area of secondary memory. The user makes keyboard entries to open a new file. Since the telephone call is from SHAREDATA, INC., the user elects to call the file SHAREDATA. The user makes keyboard entries to locate an empty file and label it SHAREDATA. For instance, if a series of files are illustrated on the CRT screen, and one of the files has a blank designation space, the user moves the cursor on the CRT screen down to the empty designation space and types in SHAREDATA. This opens a SHAREDATA file in the directory in the DS area 46 of the FS program 49.

EVENT 10

The user makes keyboard entries to open a SHAREDATA file in the directory of FS program 49. The directory of the FS program 49 is stored in the DS area 51 of the FS program 49.

EVENT 11

The user uses the CRT screen cursor to select the SHAREDATA file and depresses the RETURN key on the keyboard 10.

When the user strikes the RETURN key to select the SHAREDATA file, this indicates to the AM1 program that the user is exiting the FS program 49. The AM1 program goes to the program control table of FIGS. 5B and finds out which program requested activation of the FS program 49. As earlier noted, the MES program 48 requested the FS program. The MES program 48 has a program control number 4. This program control number 4 is, as earlier described, a part of the information concerning the FS program 49 stored in the program control table along with other entries for FS program 49. On finding that the MES program 48 requested the FS program 49, the AM1 program determines the location of the MES program 48 in main memory (either by scanning area 36 or from the program control table entry for the MES program 48), activates the MES program 48 and returns to the points at which it left the CS 58 and DS 59 areas of the MES program 48.

When the AM1 program loaded the FS program 49 and inactivated the MES program 48, the AM1 program noted in the program control table of FIG. 5B the location in the CS area 48 and in the DS area 49 of the MES program at the time of suspension. This address information enables the AM1 program to resume execution of the MES program 48 at these exact points when the AM1 program deactivates the FS program 49 and reactivates the MES program 48.

When the user, while in the active FS program 49, struck the RETURN key to select the SHAREDATA file, the FS program 49 sent a message "FILE NAME IS SHAREDATA" to the MES program 48. The message is stored in the message table of FIGS. 5E and 5F in the manner earlier described.

After the user, while in the active FS program 49, strikes the RETURN key to exit the FS program 49 and cause the AM1 program to activate the MES program 48, the MES program 48 again becomes active and assumes control. As soon as the MES program 48 is activated it, as does each resident application program 30 to 35 when it is activated in main memory, asks for any messages stored in the message table. The AM1 program transmits the message "FILE NAME IS SHAREDATA" from the message file of FIGS. 5E and 5F to the MES program 48. On receipt of the transmitted message, the MES program 48 automatically asks the AM1 program 24 to open a SHAREDATA file. The MES program automatically asks the MES program to open the file to work on the SHAREDATA file. To open the SHAREDATA file, the AM1 program asks the DOS program 22 if the SHAREDATA file exists. The DOS program 22 examines its own internal file handle control table and determines a SHAREDATA file does not exist. The DOS program 22 then creates the SHAREDATA file and, via the AM1 program, links the MES program to an unused portion of the work area 39 in secondary memory.

When the MES program 48 asks the AM1 program 24 to open a SHAREDATA file, AM1 also selects the next available space in the file handle control table of FIG. 5C. Since the auxiliary file handle numbers 1 to 3 are assigned to the BROTHER file, the AM1 program assigns the auxiliary file handle number 4 to the SHAREDATA file, and also, in the second column from the left and colinear with the auxiliary file handle number 4, enters A to indicate that the status of the SHAREDATA file is that it is active in main memory. In the middle column and colinear with the auxiliary file handle number 4, AM1 enters the number 4 to indicate the program control number of the application program from which the SHAREDATA file is selected. Program control number 4, when entered in the file handle control table of FIG. 5C, indicates that the SHAREDATA file has a "live context" which comprises program control number 4. The program control number 4 corresponds, as earlier noted, to the active MES program 48. In the fourth column from the left and colinear with the auxiliary file handle number 2, AM1 enters 6 to indicate the file handle number assigned by the DOS program 22. The AM1 program 24 obtained the DOS file handle number of 6 by asking the DOS program 22 to assign an available file handle number. The DOS program 22 assigned the first available file handle number in the range of 6 to 20 and transmitted the number to the AM1 program. Finally, in the right hand column of the file handle control table of FIG. 5C and colinear with the auxiliary file handle number 2, the AM1 program enters the first five letters of the file name, i.e., enters, as earlier noted, an address to the complete DOS path.

Once the MES program 48 is activated and the SHAREDATA file has been opened by the AM1 program 24, the user can use the keyboard to type his telephone message into the SHAREDATA file.

CURRENT STATUS ILLUSTRATION

FIGS. 6A to 6F indicate the status of the main memory 20, application program control table (FIG. 6B), file handle control table (FIG. 6C), secondary memory 21, primary address area of the message table (FIG. 6E), and message table storage area (FIG. 6F), after the program has opened the SHAREDATA file at the request of the MES program 48. Consequently, in FIG. 6A, the MES program 48 and FS program 49 are shown loaded in the limited storage area 36 of RAM 20. As indicated by the program control table of FIG. 6B, the WP program 40 is assigned a program control number of 2, has a status of S (in suspension in the virtual memory area 37), and derives from, has a "live context" of, and was requested under the application program number 1, the DESK program. In FIG. 6B, the FS program 41 is assigned a program number of 3, has a status of S (suspended in the virtual memory area) and derives from, has a "live context" of, and was requested under program control number 2, the WP program 40. In FIG. 6B, the MES program 48 has been assigned a program control number of 4, has a status of A (active in main memory) and derives from, has a "live context" of, and was requested under program control number 2, the WP program 40. In FIG. 6B, the FS program 49 has been assigned a program control number of 5, has a status of I (inactive in main memory) and derives from, has a "live context" of, and was requested under the program control number 4, the MES program 48. In FIG. 6C, there is one active file, the SHAREDATA file. The SHAREDATA file is, as shown in the file handle control table of FIG. 6C, assigned an auxiliary file handle of 4, has an associated "live context" program control number 4 (the MES program 48), and has a DOS file handle of 6. In FIG. 6C, there is one other file, the BROTHER file. The BROTHER file is, as shown in the table of FIG. 6C, assigned auxiliary file handles of 1 to 3, has an associated program control number 2 (the WP program 40), and does not have DOS file handles. The S entered in the second column from the left of the table and colinear with each of the auxiliary file handle numbers 1 to 3 indicates the BROTHER file is in suspension. A file is in suspension when its "live context" program (namely WP program 40) is in suspension in the virtual memory area 37. When an application program or file is in suspension, the DOS file handle number is released. The auxiliary file handle number remains with an application program or a file in suspension and enables the AM1 program 24 to locate an application program or a file in suspension. When a DOS file handle number is released, then the DOS program 22 is free to assign the file handle number to other application programs being transferred into main memory from secondary memory or to other active or inactive files in main memory. This enables DOS file handle numbers to be used exclusively for programs and files in main memory, whether the programs or files are active or inactive. When, however, an application program is transferred from main memory into suspension the DOS file handle number is released. The other way in which a DOS file handle is released (along with the auxiliary file handle, program control number, and any messages in the message table) is to close or cancel a program while the program is in main memory. This erases the program from main memory. A program or file can also be closed while in suspension, erasing the program or file from the virtual memory area 37 of secondary memory. This is done by activating the DESK program to cause the DESK primary display screen to appear on the CRT. The suspended file to be erased is selected with the cursor and keyboard entries are made commanding the AM1 program to close out or erase the suspended program selected by the cursor. When the WP program 40 was suspended, a portion of the BROTHER file was in the work area 39 of secondary memory 21. The address of this portion is maintained in the program control table of FIG. 6B so that it can be readily found when the WP program 40 is recalled from suspension to main memory 20 to become active and be executed. When the WP program 40 is active or inactive in main memory, the address(es) of the portion of the BROTHER file (for example, in storage areas 52A and 52C in FIG. 8) in work area 39 are maintained in the WP program Ds area 43 and in the file handle control table internally maintained by the DOS program 22. The secondary memory of FIG. 6D includes the resident programs 18, 19, 30 to 35. The virtual memory area 37 stores the WP program 40 and FS program 41. The resource data area 38 includes the original BROTHER file 47 and various files which are not shown and includes an unused portion of storage. BROTHER file 47 represents the BROTHER document prior to its being accessed by WP for revision. The work area 39 of the secondary memory includes that portion of the revised BROTHER document which would not fit in the DS area 43 of the WP program 40. The primary address area shown in FIG. 6E indicates there are no messages being stored in the message table.

After opening the SHAREDATA file in the MES program 48, the user elects to close out the FS program 49. The user makes key board entries requesting the AM1 program cancel the FS program 49. For example, the user can type in "CLOSE FS PROGRAM" to indicate to the AM1 program that the "slave" or associated program control number 5 is no longer required. This causes AM1 to cancel program 49 and any other associated "slave" programs. The associated "slave" programs comprise any programs in the program control table which have a "live context" derivation program control number of 5, or which, in other words, derived from FS program 49. When program 49 is cancelled it is deleted from the program control table to free up the program control number which had been associated with the program 49. Alternately, the WP program 48 can be written to automatically issue a "CLOSE TASK" request once a file name is received from the FS program 49.

EVENT 12

The user makes keyboard entries to command the AM1 program to "CLOSE FS PROGRAM". The AM1 program then erases or clears the slave FS program 49 from main memory. The AM1 program determines program 49 is the program to be cleared because the "CLOSE FS PROGRAM" command directed the AM1 program to clear the program with program number 5.

After typing his telephone message in the SHAREDATA file, the user wishes to return to the WP program 40.

EVENT 13

The user makes an entry on keyboard 10 to suspend the MES program 48.

There may be a single designated key which the user strikes to suspend the MES program 48; the user may type in "SUSPEND" to suspend the MES program 48; etc. as desired. Note that the user could have, while executing the active FS program 49, also suspended program by making on keyboard 10 the same entry(s) on the keyboard 10. When active MES program 48 is suspended, the AM1 program automatically activates and executes the DESK program 27, causing the DESK primary display screen to appear. In the right hand area of the DESK primary display screen the WP program 40 and MES program 48 are listed as suspended. The AM1 program adjusts the program control table of FIG. 6B by removing the A status entry for the MES program and inserting an I, which indicates that the MES program 48 is inactive in main memory.

As soon as the DESK program 27 is activated it begins asking the AM1 program for input from the keyboard 10.

The user wishes to recall the WP program 40 from suspension to continue work on the BROTHER file.

EVENT 14

The use utilizes the CRT screen cursor to select from the right hand side of the DESK primary display screen the WP program 40 which is listed, along with the MES program 48, as being suspended. The user depresses the RETURN key on the keyboard to recall the WP program 40.

The AM1 program receives the "RECALL WP PROGRAM" command after the user depresses the RETURN key to select the WP program 40. The AM1 program scans the program control table for the suspended WP program 40 having the program control number of 2. From the program control table the AM1 program learns the address in the virtual memory area 37 of the WP program 40 along with the addresses in the DS area 43 and CS area 42 when program 40 was suspended. The AM1 program also learns that the WP program 40 has a "slave" FS program 41 which is also in suspension with the WP program 40. The AM1 program knows that the FS program 41 is a slave program because the FS program 41 has a predecessor program control number of 2, which means the FS program 41 was requested by and derives from the WP program 40. The AM1 program knows the location of the FS program 41 in virtual memory 37 from the control table of FIG. 6B. Since, when the limited storage area 36 is empty, a pair of application programs 30 to 35 can be loaded in area 36, The AM1 program determines to load both program 40 and its slave program 41 in the limited storage area 36. In order to determine the addresses in area 36 at which the programs 40 and 41 will be loaded, the AM1 program surveys area 36 by examining the program control table to determine the amount of storage space occupied by programs currently in limited storage area 36. The MES program 48 occupies 120K of storage space, leaving a remaining 160K of storage space. Since the remaining 160K is insufficient to hold programs 40 and 41, the AM1 program determines that the MES program 48 must be transferred in suspension to the virtual memory area 37 in secondary memory, and then determines the location of the programs 40 and 41 in area 36. The AM1 program notes in the program control table of FIG. 6B the locations of programs 40 and 41 in area 36 (which locations are identical to the locations of programs 40 and 41 in area 36 prior to suspension of the programs 40 and 41) and the location of MES program 48 in the virtual memory area 37. Further, in the middle column of FIG. 6B colinear with the program control numbers 2 and 3 and 4, the AM1 program replaces the S with an A (program control number 2), the S with an I (program control number 3), and the I with an S (program control number 4), respectively, to indicate that program 40 is active in main memory, program 41 is inactive in main memory, and program 48 is in suspension in the virtual memory area. The AM1 program also enters in the program control table for program control number 4 the addresses in the CS area 58 and DS area 59 when the MES program 48 is suspended. In the file handle control table of FIG. 6C, the AM1 program in the second column from the left and colinear with the auxiliary file handle numbers 1 to 3, deletes each S and enters an A for each deleted S to indicate the BROTHER file is active in main memory; in the fourth column from the left and colinear with the auxiliary file handle numbers 1 to 3, enters a DOS file handle numbers 6, 7, 8 which are assigned by the DOS program 22 to the BROTHER file when the WP program 40 is transferred back into area 36; in the second column from the left and colinear with the auxiliary file handle number 4, deletes the A and enters an S to indicate the SHAREDATA file is in suspension in the virtual memory area with the MES program 48; and, in the fourth column from the left and colinear with the auxiliary file handle number 4, deletes the DOS file handle number 6 which is released for future assignment to another application program or file being transferred into the limited memory area 36. After the AM1 program 24 has made the foregoing entries in the file handle control table for auxiliary file handle numbers 1, 2, 3, 4 and in the program control table for the programs with program control numbers 2, 3 and 4, the AM1 program transfers the MES program virtual memory area 37 and transfers the WP 40 and FS 41 programs to the limited storage area 36. When programs 40 and 41 are returned to area 36, the AM1 program returns each program to the same storage space it occupied in area 36 before the program 40 or 41 was suspended and transferred to area 37. When a program 40 or 41 is suspended to area 37, the AM1 program retains in the program control table the address of the space occupied by program 40 or 41 in area 36 before the program 40 or 41 was suspended. This enables the AM1 program to return a program 40 or 41 to its identical spot in area 36 when the program is recalled from suspension. Once it is loaded in the storage area 36, the WP program 40 is activated. At any given time only one resident application program 30 to 35 in area 36 is active and being executed. When program 40 is active, program 41 is inactive, and vice-versa. When the WP program 40 is activated, the display on the CRT screen corresponds to the display which existed when the WP program was suspended for transfer to the virtual memory area 37. The AM1 program determines from the program control table of FIG. 6B the addresses in the CS area 42 and DS area 43 when program 40 was suspended. This enables the WP program, when it is reactivated, to pick up where it left off. Further, when the AM1 program activates the WP program 40, it establishes a link between program 40 and the portions 52 of the BROTHER file which were in the work area 39 at the time the WP program was suspended. The AM1 program is able to reestablish this linkage of the WP program 40 with the work area 39 because when the WP program 40 was suspended, the AM1 program noted in the file handle control table for auxiliary file handle numbers 2 and 3 the addresses of the portions 52 of the BROTHER file in work area 39. Though not shown in FIGS. 2C to 7C, a column could be illustrated showing the file pointer value address at the time a file is suspended. Note that when a program is suspended and transferred to area 37, the location of the program in area 37 is stored by the AM1 program in the program control table. The address in memory 21 of resident programs 30 to 35, 18, 19 is stored in a program control table in the DOS program 22.

EVENT 15

The user utilizes the keyboard 10 to complete editing and/or revising the BROTHER document. The user then desires to save the BROTHER document.

EVENT 16

The user makes a keyboard entry(s) requesting that the BROTHER document be saved. This keyboard entry can comprise "SAVE DOCUMENT", can comprise calling up a directory with various functions and identifying in the directory the "SAVE A DOCUMENT FUNCTION" with the CRT screen cursor and hitting return to select the "SAVE A DOCUMENT FUNCTION", etc. When the AM1 program receives the "SAVE DOCUMENT" command, it activates the FS program 41. The WP program 40 sends a message to the FS program "SAVE THE BROTHER DOCUMENT". The AM1 program stores the message in the message table of FIGS. 7E and 7F. When the AM1 program activates the FS program 41, in the middle column of the program control table of FIG. 6B colinear with the program control numbers 2 and 3, the AM1 program 24 replaces the A with an I (program control number 2), and the I with an A (program control number 3), respectively, to indicate that program 40 is inactive in main memory and program 41 is active in main memory. In the file handle control table of FIG. 6C, the AM1 program in the second column from the left and colinear with each of the auxiliary file handles 1 to 3, retains the A to indicate the BROTHER file is in main memory.

CURRENT STATUS ILLUSTRATION

FIGS. 7A to 7F illustrate the status of the main memory 20, application program control table (FIG. 7B), handle control table (FIG. 7C), secondary memory 21, primary address area of the message table (FIG. 7E), and message table storage area (FIG. 7F), after the FS application program 41 has been activated by the AM1 program 24 and just prior to the time that the FS application program asks the AM1 program 24 for any messages to program control number 3, i.e., for any messages to the just activated FS program 41. Consequently, in FIG. 7A the WP program 40 and FS program 41 are shown loaded in the limited storage area 36 of RAM 20. As indicated by the program control table of FIG. 7B, the WP program has a program control number 2, has a status of I (inactive in main memory), and derives from or was requested under the application program number 1 (to the upper right of the letters WP in FIG. 7B), the DESK program. In FIG. 7B, the MES application application program 48 has a program control number 4, has a status of S (suspended in the virtual memory area 37) and derives from or was requested under the program control number 1, the DESK program. In FIG. 7B, the FS program 41 has a program control number 3, has a status of A (active in main memory), and derives from or was requested under the application program control number 2 (to the upper right of the letters FS in FIG. 7B), the WP program 40. The FS program 49 is no longer listed in FIG. 7B in association with the program control number 5 because program 49 was, as earlier noted, closed out by the user to free up program control number 5 for subsequent assignment to another application program stored in main memory or in the virtual memory area. In FIG. 7C, the BROTHER file has auxiliary file handle numbers of 1 to 3, has a status of A (active in main memory), has an associated "live context" program control number 2 (the WP program 40), and has DOS file handle numbers of 6, 7, 8. The DOS file handle numbers 6, 7, 8 were, as earlier noted, assigned when the WP program was transferred from the virtual memory area 37 to the limited storage area 36. In FIG. 7C, the SHAREDATA file has an auxiliary file handle number of 4, has a status of S (in suspension in virtual memory with the MES program 48), has an associated "live context" program control number 4 (the MES program 48), and does not have a DOS file handle number. In FIG. 7D, the secondary memory includes the resident programs 18, 19, 30 to 35. The virtual memory area 37 stores the MES program 48. The resource data area 38 includes the original BROTHER file 47 and various other files which are not shown, and includes an unused area of storage. The work area 39 includes that portion of the revised BROTHER document which would not fit in the DS area 43 of the WP program 40. The primary address area of the message table shown in FIG. 7E indicates a message is being stored at address A1 for program control number 3. The message table storage area of FIG. 7F indicates the message stored at address A1 is "SAVE THE BROTHER FILE".

As soon as the FS program 41 is activated, it asks the AM1 program for its messages. The AM1 program transmits the "SAVE THE BROTHER FILE" message to the FS program 41. This message includes the DOS path identifying the BROTHER file. The FS program 41, on receiving the "SAVE THE BROTHER FILE" message, goes to the address in the filing system where the BROTHER file was originally stored. The user can save the BROTHER file at the same spot, can back up the original unrevised BROTHER file, can destroy the original BROTHER file, can elect to save the revised BROTHER document at another address in the FS program, etc. Once the user makes the necessary keystroke entries to save the revised BROTHER file, the FS program returns a DOS path or file handle to the WP program. The DOS path indicates the address on the secondary memory where the revised BROTHER can be stored. The FS program maintains, of course, this address in the FS program so the user can at any time ask the FS program for the DOS path or address of the revised BROTHER program in the resource data area 38 of secondary memory. Consequently, the FS program performs the limited function of storing a listing of addresses or DOS paths of files stored in the resource data area 38 of secondary memory.

If a new file address is opened in the FS program 41, the DOS program 22 insures that the new address is stored in the resident FS program 31 in secondary memory 21 so that the new address is not lost when the FS program 41 is closed out.

After the BROTHER file has been transferred to the data area 38, the AM1 program clears from area 39 the portion 52 of the BROTHER file and clears from the WP program 40 of the BROTHER file in DS area 43. AM1 also removes the BROTHER file from the file handle control table of FIG. 7C to free the auxiliary file handle number 1 for assignment to another file.

When a program is recalled to area 36 from suspension in area 37 of secondary memory, the AM1 program supplies the DOS program with the position pointers or addresses in the DS area of the program and in the work area 39 of secondary memory so that the DOS program 22 can position these pointers. The position pointer or address in the CS area of the recalled program is information that only the AM1 program needs to know. When the recalled program is reactivated in area 36, the AM1 program simply moves the pointer to the next sequential instruction.

Note that each group of FIGS. 2A-2F, 3A-3F, 4A-4F, 5A-5F, 6A-6F, and 7A-7F each represents the status at a common instant in time of each of the memories or tables depicted in the group. Consequently, not every subsequent change in a memory or table illustrated in a particular group of FIGS. will be shown in FIGS. 2 to 7.

Having described my invention in such terms as to enable those skilled in the art to understand and practice it, and having identified the presently preferred embodiments thereof, I claim:

1. A computer system run under a disk operating system (DOS) and including
   (a) main memory means including a limited storage area for storing at least one application program to become an active program and be executed;
   (b) secondary memory means including
      (i) an area for storing resource data including resident files,
      (ii) an area for storing inactive resident application programs for transfer to said limited storage area of the first memory means for execution, each of the resident programs sized to be stored within an area having the storage capacity of the limited storage area and each including a data storage (DS) area and a computer logic storage (CS) area,
      (iii) a virtual memory area for storing, in suspension, an application program transferred from the limited storage area prior to completion of execution of the program;
      (iv) a work area for, during execution of an active application program in the limited storage area, storing program data in excess of the storage capacity of the DS are of the active application program;
   (c) controller means responsive to said active program for operating on the resource data;
   (d) keyboard means for entering user commands for controlling execution of application programs and for controlling the transfer of application programs between the main memory means and the secondary memory means;
   (e) application transfer means responsive to a resident application program request resulting from user commands or the execution of a presently active application program in the limited storage area to transfer a corresponding resident application program from secondary memory to the limited storage area of the primary memory means to become an active program and be executed;
   (f) application program suspension means responsive to operation of an application program suspension request resulting from user commands or the execution of a presently active application program in the limited storage area to
      (i) transfer the corresponding application program, including all data in the DS area of the corresponding program, from active status in the limited storage area to the virtual memory area in suspension prior to completion of execution in the main memory means of the corresponding application program,
      (ii) determine the DS address entry, if any, identifying the location in scanning data in the DS area of the corresponding active application program when the program is suspended for transfer to the virtual memory area and to transmit the DS address entry,
      (iii) determine the CS address entry, if any, identifying the location in executing logic steps in the CS area of the corresponding active program when the program is suspended for transfer to the virtual memory area and to transmit the CS address entry, and,
      (iv) determine the work area address entry, if any, identifying the location in the work area of the secondary memory means of program data from the corresponding active application program which is stored in the work area when the corresponding active program is suspended, and to transmit the work area address entry;
   (g) memory manager means responsive to operation of the
      (i) application program transfer means for surveying the limited storage area and assigning an application program storage space in the limited storage area for storing the corresponding resident application program to be transferred into the main memory means, and,
      (ii) application program suspension means for surveying the virtual memory area and assigning the application program storage space in the virtual memory area for storing the corresponding application program to be transferred from active status in the limited storage area in suspension into the virtual memory area;
   (h) transmission means responsive to the operation of the
      (i) application program transfer means for creating a LS program location address entry indicating the location of the corresponding application program in the limited storage area when the corresponding resident program is transferred from the secondary memory means into the limited storage area and for transmitting the LS program location address entry, and
      (ii) application program suspension means for creating a VM program location address entry indicating the location of the corresponding application program in the virtual memory area when the corresponding program is transferred from active status the limited storage area in suspension into the virtual memory area and for transmitting the VM program location address entry;

(i) application program control table means responsive to operation of the application program transfer means
  (i) for creating an application program control table corresponding to the resident application program to be transferred from the secondary storage means to the limited storage area to become active and be executed, each program control table containing information used in transferring the corresponding application to and from suspension in the virtual memory area and in controlling execution of the corresponding application program,
  (ii) generating a corresponding program control table identification entry, each program control table identification entry linking the application program to the corresponding program control table,
  (iii) for receiving and storage in the control table the transmitted
    (1) LS and VM program location entries transmitted by the transmission means for the corresponding application program,
    (2) DS entries transmitted by the program suspension means for the corresponding application active program when the corresponding application program is suspended,
    (3) work area address entries transmitted by the program suspension means for identifying the location in the work area of program data from the corresponding active program stored in the work area when the corresponding program is suspended, and
    (4) CS entries transmitted by the program suspension means for the corresponding application active program when the corresponding application program is suspended,
  the most recent of the entries for each of (i)(iii)(1), (i)(iii)(2), (i)(iii)(3), and (i)(iii)(4) being identified in the control table;
(j) application program recall means responsive to operation of an application program recall request resulting from user commands or the execution of a presently active application program to transfer a corresponding suspended application program including the data in the DS area of the corresponding suspended application program from the virtual memory area to the limited storage area to be an active application program to be executed; and,
(k) means responsive to operation of the application program recall means for examining in the control table for the corresponding recalled application program the most recent
  (i) program location address entry to locate the corresponding recalled application program in the virtual memory area,
  (ii) DS address to determine the address in the DS area of the corresponding recalled application program when the corresponding recalled application program was suspended, and
  (iii) CS address to determine the address in the CS area of the corresponding recalled application program when the corresponding recalled application program was suspended.

2. The computer system of claim 1 including means for an active application program in the limited storage area to send a message to another application program, including (a) message transfer means responsive to a message transmittal request resulting from user commands or the execution of a presently active application program to transmit a message from a corresponding active application program in the limited storage area, the message including data identifying the application program receiving the message;
(b) application program message control means responsive to operation of the message transfer means for
  (i) creating an application program message table corresponding to the application program receiving the message transmitted by the message transfer means from the corresponding active application program, each message table containing information used in transmitting the message to the receiving application program, and
  (ii) generating for the message table a corresponding receiving program message table identification entry, each program message table identification entry linking the receiving application program to the corresponding message table;
  (iii) receiving the message transmitted by the message transfer means and storing the message in the message table corresponding to the application program receiving the message; and,
(c) message transmittal means responsive to a message transmittal request resulting from user commands in the activated receiving application program or to the execution of the active receiving application program to transmit the message from the corresponding message table to the activated receiving application program.

3. The computer system of claim 1 including means for selecting a resident file for use in an active application program and for monitoring the location of the file in the main memory means and the secondary memory means, including
(a) file selection means responsive to a select file request resulting from user commands during a presently active application program or from the execution of a presently active application program to select a corresponding resident file from the secondary memory means for use in execution of the active application program;
(b) file handle table means responsive to operation of the file selection means for
  (i) creating a file handle control table corresponding to the selected file, each file handle control table containing information used in transferring the active application program to and from suspension in the virtual memory area and in transferring the selected file between the secondary memory means and the main memory means,
  (ii) generating for the file handle control table a corresponding file control table DOS handle, each DOS handle linking the selected file to the corresponding file control table,
  (iii) when the active application program is transferred to the virtual memory area or when the selected application program to storage in secondary memory, releasing the DOS handle from the control table to subsequently be assigned to another file or resident application program being transferred from the secondary memory means to the main memory means,
  (iv) generating for the file handle control table a corresponding file control table auxiliary handle, the auxiliary handle linking the selected file to the corresponding file control table and remaining in the file control table when the active application program in which the selected file is used is transferred to the virtual memory area or when the corresponding selected file is transferred from the active application program to storage in the secondary memory means, and (v) creating for the file handle control table a file application program entry linking the selected file to the corresponding application program most recently utilizing the selected file.

* * * * *